(12) United States Patent
Vogel et al.

(10) Patent No.: US 10,099,308 B2
(45) Date of Patent: Oct. 16, 2018

(54) METHOD AND APPARATUS FOR WELDING WITH BATTERY POWER

(75) Inventors: Bernard J. Vogel, Troy, OH (US);
Richard W. Beeson, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 2647 days.

(21) Appl. No.: 11/350,638

(22) Filed: Feb. 9, 2006

(65) Prior Publication Data

US 2007/0181547 A1    Aug. 9, 2007

(51) Int. Cl.
*B23K 9/10*    (2006.01)

(52) U.S. Cl.
CPC .................. *B23K 9/1081* (2013.01)

(58) Field of Classification Search
CPC .................. B23K 9/10; B23K 9/12
USPC ............. 219/130.1, 130.5, 130.21, 137.7
See application file for complete search history.

(56) References Cited

U.S. PATENT DOCUMENTS

| | | | |
|---|---|---|---|
| 3,365,644 A | 6/1964 | Smallman | |
| 4,182,949 A | 1/1980 | Powers et al. | |
| 4,590,357 A | 5/1986 | Winkler | |
| 4,705,934 A | 11/1987 | Winkler | |
| 4,801,780 A | 1/1989 | Hayes | |
| 5,086,208 A | 2/1992 | Habermann | |
| 5,233,159 A | 8/1993 | Day | |
| 5,250,786 A | 10/1993 | Kikuchi et al. | |
| 5,371,456 A * | 12/1994 | Brainard | 320/161 |
| 5,410,126 A | 4/1995 | Miller et al. | |
| 5,698,967 A * | 12/1997 | Baer et al. | 320/152 |
| 6,111,215 A | 8/2000 | Lilly | |
| 6,225,596 B1 | 5/2001 | Chandler et al. | |
| 6,239,407 B1 | 5/2001 | Thommes | |
| 6,331,694 B1 * | 12/2001 | Blankenship | 219/137 PS |
| 6,512,201 B2 | 1/2003 | Blankenship | |

(Continued)

FOREIGN PATENT DOCUMENTS

| | | | |
|---|---|---|---|
| GB | 2316244 A | 2/1998 | |
| JP | 63016868 A * | 1/1988 | ............... B23K 9/16 |
| JP | 2000-42740 | 2/2000 | |

*Primary Examiner* — Dana Ross
*Assistant Examiner* — Ayub Maye
(74) *Attorney, Agent, or Firm* — George R. Corrigan

(57) ABSTRACT

A method and apparatus provides welding-type power and preferably includes a removable battery or other energy storage device, a converter connected to the battery, and a controller. The controller may have a CV and/or a CSC and/or an AC weld control module, and/or an ac auxiliary control module. The converter is a boost converter, a buck converter, a cuk converter, a forward converter, an inverter, a bridge converter, and/or a resonant converter. The controller may include a battery charging control module, and may have one or more charging schedules, and/or data for stored charge, thermal information, expected life of the battery, maximum amp-hour charge for the battery, maximum charging current and/or feedback. The battery charging schedules may include at least 3 phases, such as a phase of increasing voltage and a phase of decreasing current, a substantially constant power phase. The controller can wirelessly provide data to a display or pda. A generator may provide power to the battery, charger, and/or the weld. It can include a vehicle and use its dc power system.

13 Claims, 10 Drawing Sheets

(56) References Cited

U.S. PATENT DOCUMENTS

| | | | |
|---|---|---|---|
| 6,531,685 B2 * | 3/2003 | Smith | 219/133 |
| 6,653,596 B2 | 11/2003 | Blankenship | |
| 6,713,708 B2 | 3/2004 | Hedberg | |
| 6,747,246 B2 * | 6/2004 | Crandell, III | 219/130.1 |
| 6,818,860 B1 * | 11/2004 | Stave et al. | 219/130.1 |
| 6,833,683 B2 | 12/2004 | Winkler | |
| 6,982,398 B2 * | 1/2006 | Albrecht | 219/133 |
| 7,183,517 B2 * | 2/2007 | Albrecht et al. | 219/130.4 |
| 2005/0109748 A1 | 5/2005 | Albrecht et al. | |
| 2005/0224478 A1 | 10/2005 | Stropki, Jr. et al. | |
| 2006/0037953 A1 | 2/2006 | Matthews et al. | |

* cited by examiner

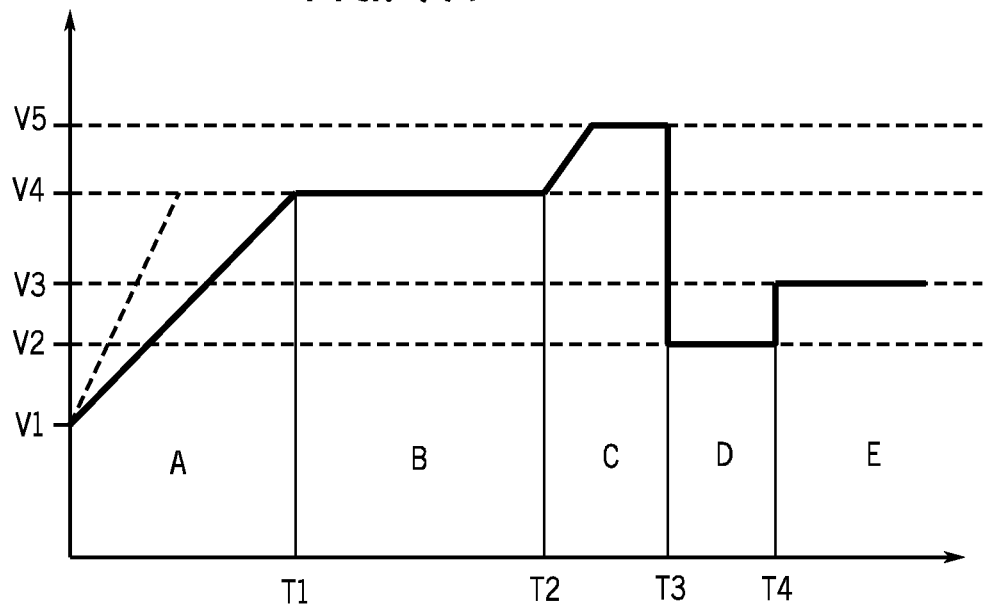
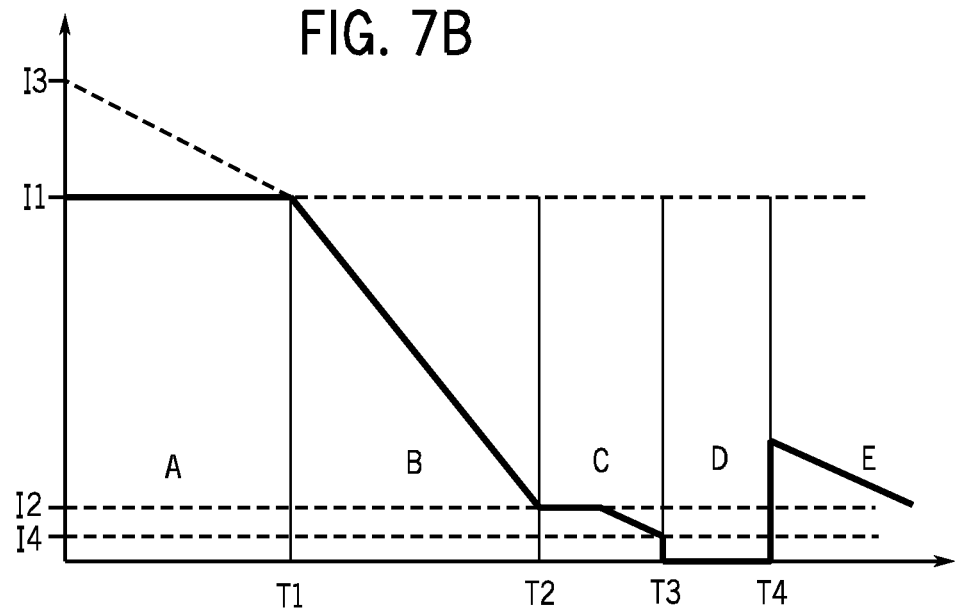

METHOD AND APPARATUS FOR WELDING WITH BATTERY POWER

FIELD OF THE INVENTION

The present invention relates generally to the art of welding-type power supplies. More specifically, it relates to welding-type power supplies that derive power from a battery or other energy storage device.

BACKGROUND OF THE INVENTION

There are many known welding-type power supplies used for many known applications. Often, a particular power supply will have a topology and a control scheme chosen or optimized for particular welding applications. For example, a welding power supply might be designed for CV welding, AC welding, CC welding, or controlled short circuit (CSC) welding. Welding-type power supply, as used herein, includes any device capable of supplying welding, plasma cutting, and/or induction heating power, as well as control circuitry and other ancillary circuitry associated therewith.

Welding-type power supplies receive power and convert or transform that power into power suitable for welding. Known types of power supplies include transformer based power supplies and switched based power supplies, including buck, boost, PWM, chopper and other topologies. The input power is usually utility power or derived from an engine/generator. Welding power supplies with utility or engine power have been commercially successful for many years, although traditionally power supplies were designed to receive a limited range of input power voltages from either utility or an engine (but not both). Recently, power supplies have become more versatile and can be used for a variety of processes and receive a wide range of input voltages from either a utility source or an engine. (See, e.g. U.S. Pat. No. 6,239,407, hereby incorporated by reference).

Attempts have been made to power welders with other sources such as batteries or vehicles. However, battery power welders have been of limited application because battery power does not lend itself to long term high power outputs such as welding, and the control of such systems has not been able to provide a versatile, useful, welding source. Additionally, battery welders have not provided an AC auxiliary output (i.e., a 115 or 230 volt output that can be used as a substitute for utility power for tools, lights, etc.).

There are numerous applications for welding that are remote from a source of power. Many of these welding applications also have a need for AC auxiliary power (such as 115 VAC or 230 VAC). The AC auxiliary power may be used to operate grinders, saws or other power tools used to prepare for welding, or used for other applications at the remote site. The requirement for welding power and/or AC auxiliary power may be for short, intermittent periods of time, but spread out over a duration of several hours or more.

Prior art systems provide welding power for such remote applications with an engine driven welder/generator. The engine driven welder/generator is often started and left running for the total duration of the welding task or other task requiring AC power, even though the demand for the welding power or AC power is of a limited sporadic nature. Prior art engine/generators often operate at a fixed RPM to provide the fixed frequency (50/60 Hz, e.g) AC auxiliary power. This may require the engine to run at a speed well above an idle speed to maintain 60 Hz AC power even though the total power demand can be quite low. This can lead to excess wear, fuel consumption, and noise.

Accordingly, AC aux power that does not require an engine to run at a fixed RPM is desirable. Such, a system preferably will be able to receive battery power as an input. Also, such a system will preferably be able to be used in a variety of applications, and will provide for charging the battery. Also, such a system will preferably provide an auxiliary output.

Welding-type systems have utility across a wide range of industries including manufacturing, construction, automotive, and service industries. Welding-type processes are often required at elevated heights, and where utility power is not available, such as for ship building, bridges, constructions, etc. An operator is often required to be elevated through the use of a lift, such as a boom lift or a scissor lift. Scissor lifts and boom lifts have many applications across many industries. Both lifts generally include a drive assembly attached to the base for positioning the lift and a power system having any one of an engine, a motor, a battery array, or combination thereof. The power system of the lift is connected to the drive assembly and moves the lift from location to location, as well as elevates the platform. A welding-type power supply that can be used with a dc power system on a vehicle is thus desirable.

SUMMARY OF THE PRESENT INVENTION

According to a first aspect of the invention a welding-type power supply includes a battery or other energy storage device, a converter connected to the battery, and a controller. The controller has a CV control module, and/or a CSC control module and/or an AC weld control module, and controls the converter to provide a welding-type power output.

According to a second aspect of the invention a welding-type power supply includes a battery or other energy storage device, a converter that converts power from the battery, and a controller. The controller has an ac auxiliary control module that controls the converter, which provides an auxiliary output, and/or a welding type output.

According to a third aspect of the invention a method of providing welding-type power includes receiving battery or other energy storage device power, converting the battery power to welding-type power, and controlling the converting such that the welding-type power is CV power, and/or CSC power and/or AC welding power.

According to a fourth second aspect of the invention a method of providing welding-type power includes receiving battery or other energy storage device power, converting the battery power to welding-type power, and converting the battery power to be ac auxiliary power.

According to another aspect of the invention a welding-type power supply includes a battery or other energy storage device, a battery charger, a converter and a controller.

According to yet another aspect of the invention a method of providing welding-type power includes charging a battery or other energy storage device, converting power from the battery to welding-type power and controlling the converting.

According to yet another aspect of the invention a welding-type power supply has an input circuit that can be connected to a battery or other energy storage device. The battery or device can store energy sufficient to weld at least one stick electrode. A first converter is connected to the input circuit, and provides as an output a dc bus. A second converter receives the dc bus and provides a welding-type power output to an output circuit. A controller controls switching in the two converters. The first converter is a boost and the second a buck in one embodiment.

According to yet another aspect of the invention a vehicle and welding power supply include a vehicle dc power system has an energy storage device capable of storing energy sufficient to weld at least one stick electrode. A first converter is connected to the dc power system and provides a dc bus. A second converter receives the dc bus and provides a welding-type power output. A controller controls the switching in the converters, including controlling the output current magnitude of the second converter. The first converter is a boost and the second a buck in one embodiment.

The energy storage device may be a capacitor, that is preferably capable of storing energy sufficient to weld at least one stick electrode.

The controller has a CC control module or a plasma control module in various embodiments.

The converter has an ac auxiliary output and the controller has an ac auxiliary control module and/or a second converter for ac auxiliary power in other embodiments.

The converter is a boost converter, a buck converter, a cuk converter, a forward converter, an inverter, a bridge converter, and/or a resonant converter in various embodiments.

The battery and/or battery charger is removable in some embodiments.

The battery is a lead acid battery, a sealed lead acid, Ni—Cd, NiMH, or lithium ion battery, and includes a plurality of batteries in series or parallel in various embodiments.

A welding gun, and/or a wire feeder and/or a source of gas are included in other embodiments.

The controller has a CV control module, and/or a CSC control module and/or an AC weld control module, and controls the converter to provide a welding-type power output in various embodiments.

The converter includes a preregulator that receives power from the battery and converts it to provide a dc signal to a bus, and the bus is connected as an input to a weld output circuit in various embodiments.

The controller includes a battery charging control module, and may have one or more charging schedules, and/or stored charge data, and/or expected life of the battery data, and/or maximum amp-hour charge for the battery, and/or maximum charging current data in various embodiments.

The battery charging schedules may include at least 3 phases, and/or a first phase of increasing voltage and a second phase of decreasing current, and/or a substantially constant power phase in various embodiments.

The controller includes a data port, such as one connectable to a display, a pda, connected to the data storage control module, by wire or wireless, in some embodiments.

The battery charging control module includes feedback inputs relating to thermal information, voltage, current, power, etc, in other embodiments.

A generator provides power to the battery, charger, energy storage device, and/or the ac auxiliary converter or output in various embodiments.

The generator provides power to a weld power circuit, and welding-type power from the weld circuit and the converter are combined in various embodiment. The weld power circuit can include a converter.

The controller includes a battery protection module that limits welding in another alternative. The controller can also include a battery voltage sensing module that is active at start up, and provides a signal to the battery protection module. The battery protection module receives as an input at least one of data relating to amp-hours provided by the battery, battery voltage, amp-hours provided by the welding-type power supply, and thermal data in another embodiment.

The vehicle is a lift system in another alternative.

Other principal features and advantages of the invention will become apparent to those skilled in the art upon review of the following drawings, the detailed description and the appended claims.

BRIEF DESCRIPTION OF THE DRAWINGS

FIG. 7 is graph showing a charge schedule in accordance with one aspect of the invention;

Figure 1:
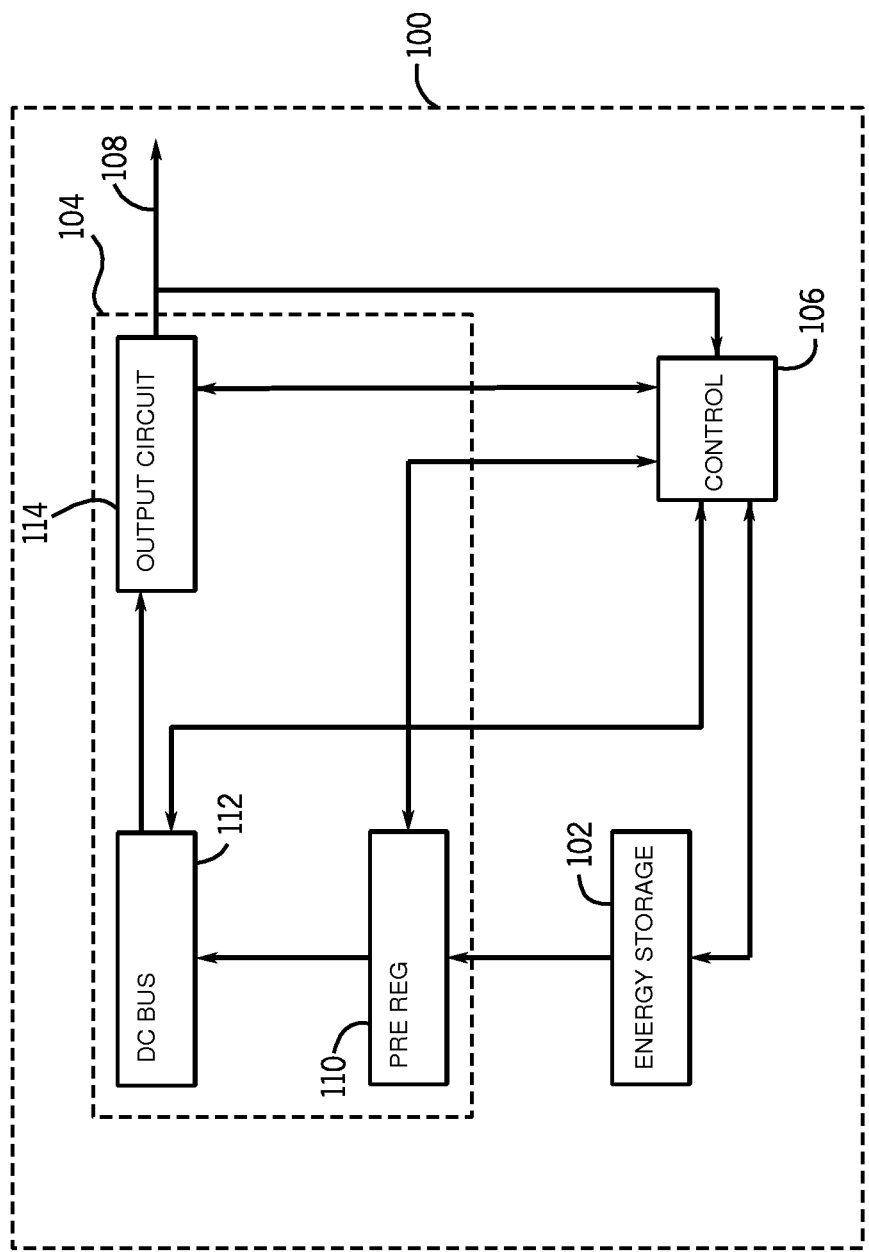
FIG. 1 is block diagram of a welding type power supply in accordance with one embodiment of the invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular components, topologies, controls, and applications, it should be understood at the outset that the invention may also be implemented with other components, topologies, controls and applications.

Generally, the invention relates to a welding power supply that includes a battery and/or an engine/generator and/or a vehicle for input power. Preferably, a battery charger is included (or provided by the user) to charge the battery. The source of power for the battery may also be used to supplement the battery power to provide welding power.

One embodiment provides for a welding-type power supply 100, shown in FIG. 1, that includes a battery (or other energy storage device) 102, a converter 104 and a controller 106, that cooperate to provide power to a welding-type output 108. Battery, as used herein, includes any type of battery. Energy storage device, as used herein, includes a device that stores energy, such as a capacitor, inductor, battery, etc. Controller, as used herein, includes digital and analog circuitry, discrete or integrated circuitry, microprocessors, DSPs, etc., and software, hardware and firmware, located on one or more boards, used to control a device such as a converter, power supply, or power source. Converter, as used herein, includes a switched power circuit or linear regulator that receives or provides an ac or dc signal, and converts it to at least one of the other of an ac or dc signal, or to a different frequency, or to a different magnitude, and can include cascading converting where the output is the same frequency or magnitude or ac/dc as the input, but is different in an intermediate stage.

Converter 104 includes, in the preferred embodiment, a preregulator 110 (preferably a converter), a dc bus 112, and an output circuit 114. Preregulator, as used herein, includes a circuit that conditions power prior to the output circuit. Converter 104 preferably includes a boost converter for preregulator 110, such as that shown in U.S. Pat. No. 6,239,407 and can receive a wide range of inputs, and provides dc bus 112. The dc bus is then provided to output circuit 114, which is preferably a PWM buck converter, whose output is transformed to welding-type power. Welding type power, as used herein, refers to welding, plasma or heating power. Welding-type power output, as used herein, includes an output on which welding-type power is provided.

Other embodiments provide other power converting, such as using a buck converter instead of the boost converter, a combination of boost-buck, or other converter types such as a cuk converter, a forward converter, a bridge converter, a resonant converter, a chopper, or welding directly off dc bus 112. Converting power, as used herein, includes converting an ac or dc signal to at least the other of an ac or dc signal, or to a different frequency, or to a different magnitude, and can include cascading converting where the output is the same frequency or magnitude or ac/dc as the input, but is different in an intermediate stage.

Controller 106 may be implemented using components that are digital, analog, or a combination thereof. Generally, controller 106 controls converter 104 (such as the switch timing) to convert the input power to the desired output power. Controller 106 may include one or more control modules (such as a CC control module 305, a CV control module 307, a CSC control module 309, an AC control module 311 and/or a plasma control module) that are activated, by the user or by the system, to provide the desired output power for a desired application.

AC weld control module, as used herein, includes a control module that controls a power circuit to provide ac welding-type power. CC control module, as used herein, includes a control module that controls a power circuit to provide CC power. CSC control module, as used herein, includes a control module that controls a power circuit to provide CSC power. CV control module, as used herein, includes a control module that controls a power circuit to provide CV power. Plasma control module, as used herein, includes a control module that controls a power circuit to provide plasma power. Control module, as used herein, may be digital or analog, and includes hardware or software, that performs a specified control function. AC weld power, as used herein, includes ac output power suitable for ac welding.

CC power, as used herein, includes power suitable for CC welding, i.e., power provided at a substantially desired current, or a desired current slope, and includes both open and closed loop controls. CV power, as used herein, includes power suitable for CV welding, such as power at a desired output voltage, either constant, or in accordance with a varying waveform.

The output of converter 104 is in electrical communication with the welding output (it may be provided directly, or through components such as resistors, inductors, filters, etc.). In electrical communication with, as used herein, refers to two circuits or components connected, either directly or through other circuits and/or components.

In operation controller 106 preferably receives feedback from the output (and/or an intermediate stage) and provides one or more control outputs to one or more control inputs on converter 104. Control output, as used herein, includes an output used to control a circuit. Control input, as used herein, includes an input used to control the circuit, such as a setpoint, gate signals, phase control signals, etc.

Battery 102 is removable in the preferred embodiment (and not removable in other embodiments). For example, battery 102 could be connected to system 100 in a manner similar to that of the battery connections to cordless power tools. A battery being removable, as used herein, includes a battery that is easily removed by the user, such as removing a detachable cover and disconnecting battery terminals, without creating safety issues or requiring excessive work. The battery is preferably a lead acid battery, and is a sealed lead acid, Ni—Cd, NiMH, or lithium ion battery in other embodiments. It is a capacitor (such as an Ultracapacitor from Maxim), or a fuel cell, or other energy storage devices, in other embodiments. Preferably it is capable of storing energy sufficient to weld at least one stick electrode. Battery or energy storage device 102 may be disposed inside or outside the main welding housing.

Multiple batteries are provided in the preferred embodiment. They can be arranged in series, or in parallel, and battery refers to one or more batteries. The arrangement of the batteries will depend on the power needed, and the desired voltage. For example, the desired input voltage for a boost circuit can be lower than the desired input voltage for a buck circuit. Examples of battery voltages include 12 volt, 24 volt, 42 volt and 48 volts. Each battery can provide, for example, 16 amp-hours of power at a nominal rated voltage of, for example, 24 volt (two lead acid batteries in series).

Generally, battery 102 provides energy when the unit is not connected to commercial or generator power. Power from battery 102 can also be added to utility or generator power, thus providing more output than would normally be possible from the utility or generator power, for short periods of time.

One embodiment provides for a converter 104 being a single stage buck converter, and is preferred when the battery voltage is greater than the welding voltage requirement, and the welding process is constant voltage (CV) regulated output for GMAW. This may be used, for example, with a 36 V or a 24 V battery for GMAW, which it is typically performed at about 15-18 volts. The system can be a battery powered MIG welder having battery 102, converter 104, a wire feeder, a battery charger, and a gas supply. A variation is a single stage buck converter with feedback, and controlled to operate in a CC mode.

Figure 9:
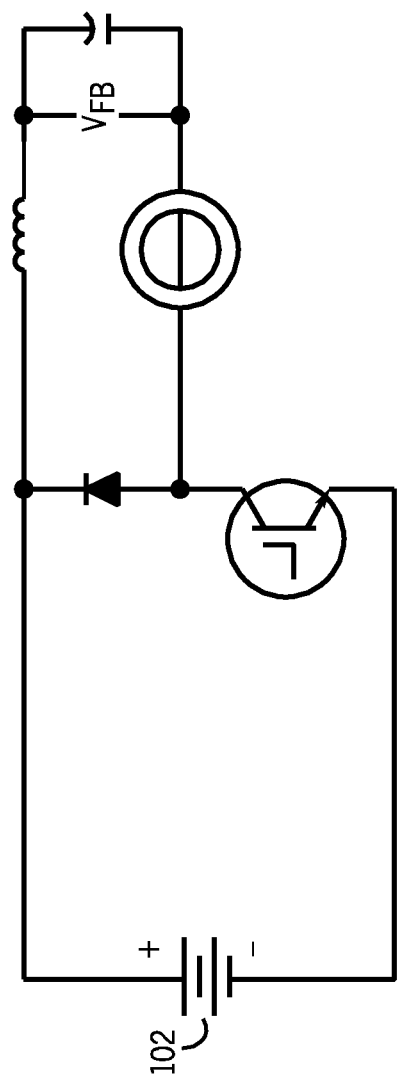
FIG. 9 is a schematic diagram of a welding-type power supply in accordance with one embodiment of the invention.
Figure 10:
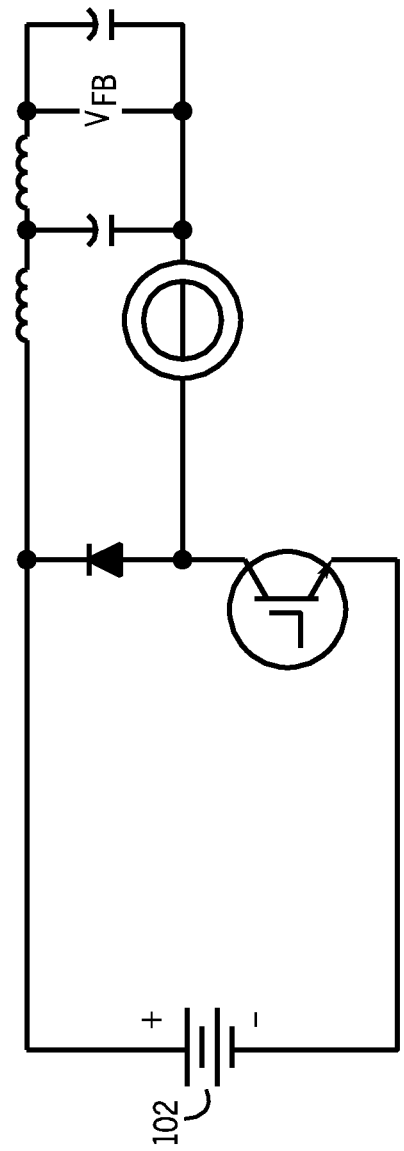
FIG. 10 is a schematic diagram of a welding-type power supply in accordance with one embodiment of the invention.

Referring now to FIG. 9, a buck converter is shown using battery 102 as input power. Preferably the switch is pulse width modulated at a switching frequency in the range of 20 KHz to 100 KHz. Current feed back is provided through a current sensor. The inductor smooths the high frequency switching ripple. A second inductor and a capacitor can be added, as shown in FIG. 10, wherein the capacitor stores sufficient energy to facilitate the clearing of a short circuit by providing the dynamic current required. Other alternatives include receiving dc bus power instead of battery power, and/or topologies listed above, such as a boost-buck converter.

Figure 2:
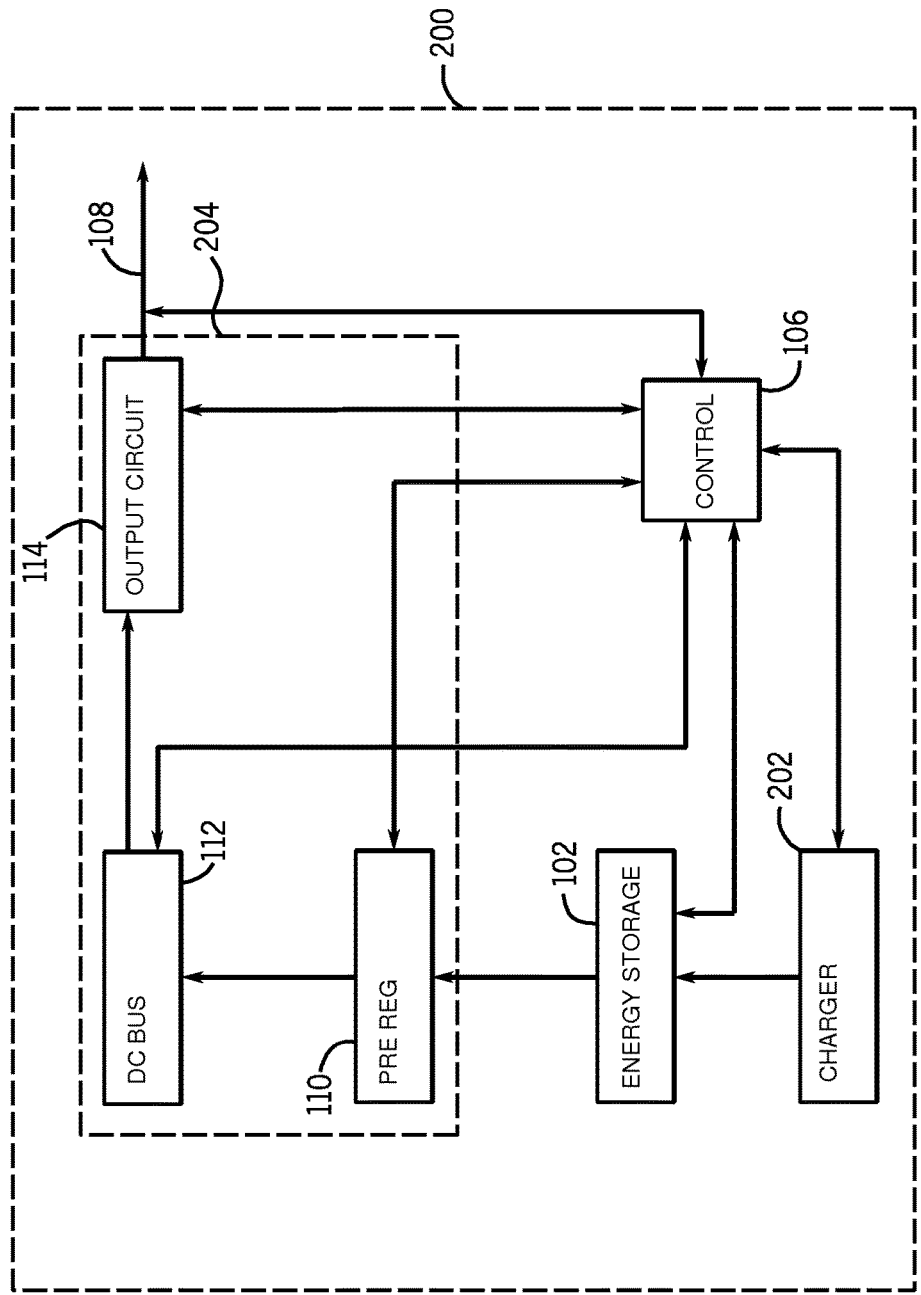
FIG. 2 is block diagram of a welding type power supply in accordance with one embodiment of the invention.

Referring now to FIG. 2, a second embodiment showing a welding system 200 includes, in addition to the components described in FIG. 1, a battery charger 202, and converter 104 is replaced with a welding circuit 204. Such a system may be used for one or more welding processes, such as GMAW, SMAW, FCAW, and/or GTAW. A shielding gas source may be included. Input power may be provided from an engine/generator, which may be part of system 200, or other sources (utility, etc.). As will be described in detail below charger 202 and battery 102 may be controlled in accordance with particular charging schedules. Welding circuit 204 may be identical to converter 104, or it may be as simple as a dc bus created by battery 102 and used for a dc weld output. Charger 202 may be removable, as may be battery 102. Controller 106 may have the various modules described above or below, and battery 102 may be an energy storage device as described above. Other alternatives provide for using the system strictly as a charger for charging external batteries (and not as part of a welding system), or for providing a battery "boost" for engine starting, as part of or not part of a welding system.

Figure 3:
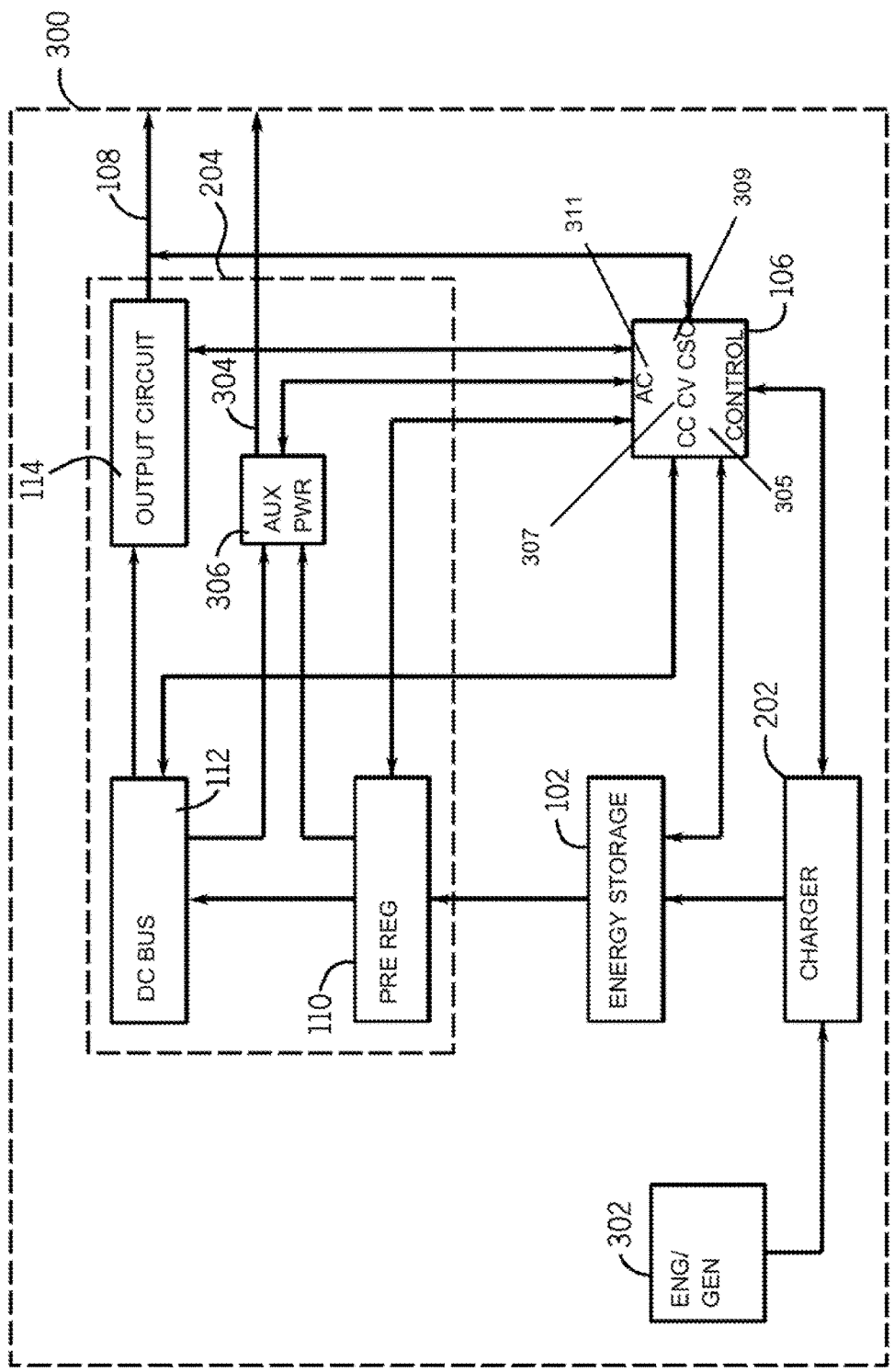
FIG. 3 is block diagram of a welding type power supply in accordance with one embodiment of the invention.

Referring now to FIG. 3, another embodiment showing a welding system 300 includes, in addition to the components described in FIGS. 1 and 2, an engine/generator 302 and an auxiliary power output circuit 306. Generator, as used herein, includes a generator and can include an engine or primary mover, or can include a vehicle engine/alternator/generator. Auxiliary power output 304 is, in the preferred embodiment, an output that may be used to power tools, lights, or other equipment that is typically powered by 115 or 230 VAC power. The ac aux output may preferably be used while welding is being performed. In some embodiments, ac aux and welding power are provided at mutually exclusive times. AC auxiliary output, as used herein, includes an output having power simulating utility power. AC auxiliary control module, as used herein, includes a control module that controls a power circuit to provide ac auxiliary power. AC auxiliary power, as used herein, includes power simulating utility power, and includes square, sine, triangular, and similar waves.

The auxiliary power is preferably derived from converter 204, and particularly from an auxiliary converter 306. Alternatives provide for the welding power circuits to be controlled to provided ac auxiliary power, and/or deriving aux power directly from generator 302, and/or deriving aux power from battery 102 when generator 302 is not on, and/or automatically switching sources depending on whether or not generator 302 is on. Controller 106 can monitor the status of battery 102 and automatically start the engine when battery 102 is depleted to a certain point (or when weld or AC aux power reaches a threshold), or automatically idle the engine when battery 102 is fully charged, or the speed of the engine can be controlled based on the requirements of the battery (or the battery and the output). A user override can be provided to control starting, stopping, or automatically idling the engine.

Controller 106 preferably controls circuit 306, which is a buck converter or an inverter run off dc bus 112, in the preferred embodiment (the portion of controller 106 that controls aux power circuit 306 may be considered a controller itself). The output may be a rectangular waveform or a synthesized sine wave, or other waves. Circuit 306 derives power directly from battery 102 in other embodiments. In various embodiments, engine/generator 302 is part of, in a common housing with, or separate from, welding system 300. In other embodiments ac auxiliary power circuit 306 and output 304 are omitted. Controller 106 may have the various modules described above or below, and battery 102 may be an energy storage device as described above. Another embodiment provides for the omission of charger 202. System 300 is a MIG welder in one embodiment.

Figure 4:
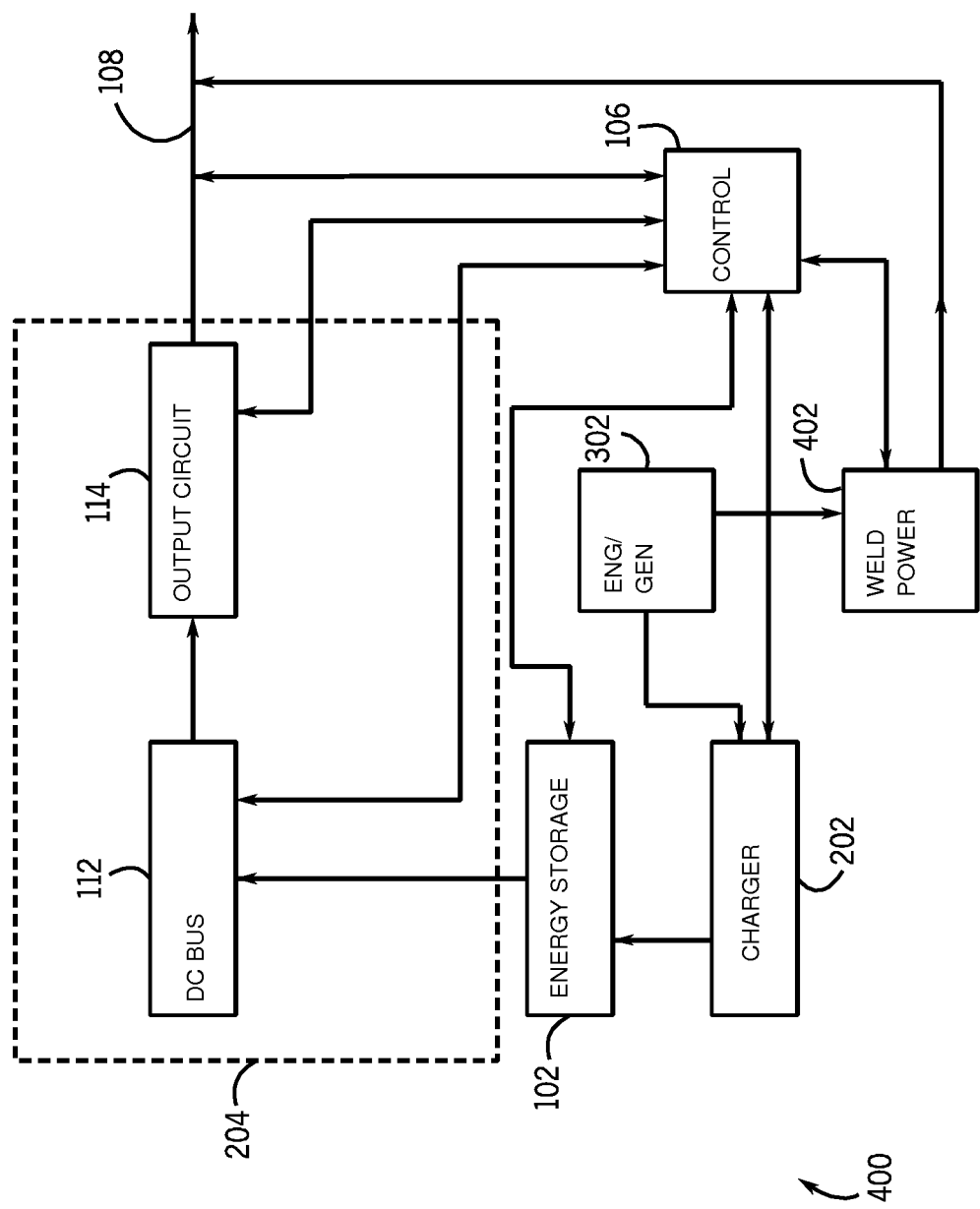
FIG. 4 is block diagram of a welding type power supply in accordance with one embodiment of the invention.

Referring now to FIG. 4, another embodiment showing a welding system 400 includes engine/generator 302 (which can be part of a vehicle), battery 102, battery charger 202, welding circuit 204, and a weld power circuit 402 that derives power directly from generator 302. Power from circuit 402 and converter 204 is combined to produce a single welding output, in the preferred embodiment. Various components have been described above with respect to previous embodiments, and will not be described here. Weld power circuit 402 may be any known welding power circuit that operates off a generator, including choppers, inverters, converters, etc. Various alternatives include providing engine power to charger 202 or battery 102 (to charge the battery), as well as the variations described above and below with respect to other embodiments, as well as omitting generator 302 and using utility power as input power.

Figure 5:
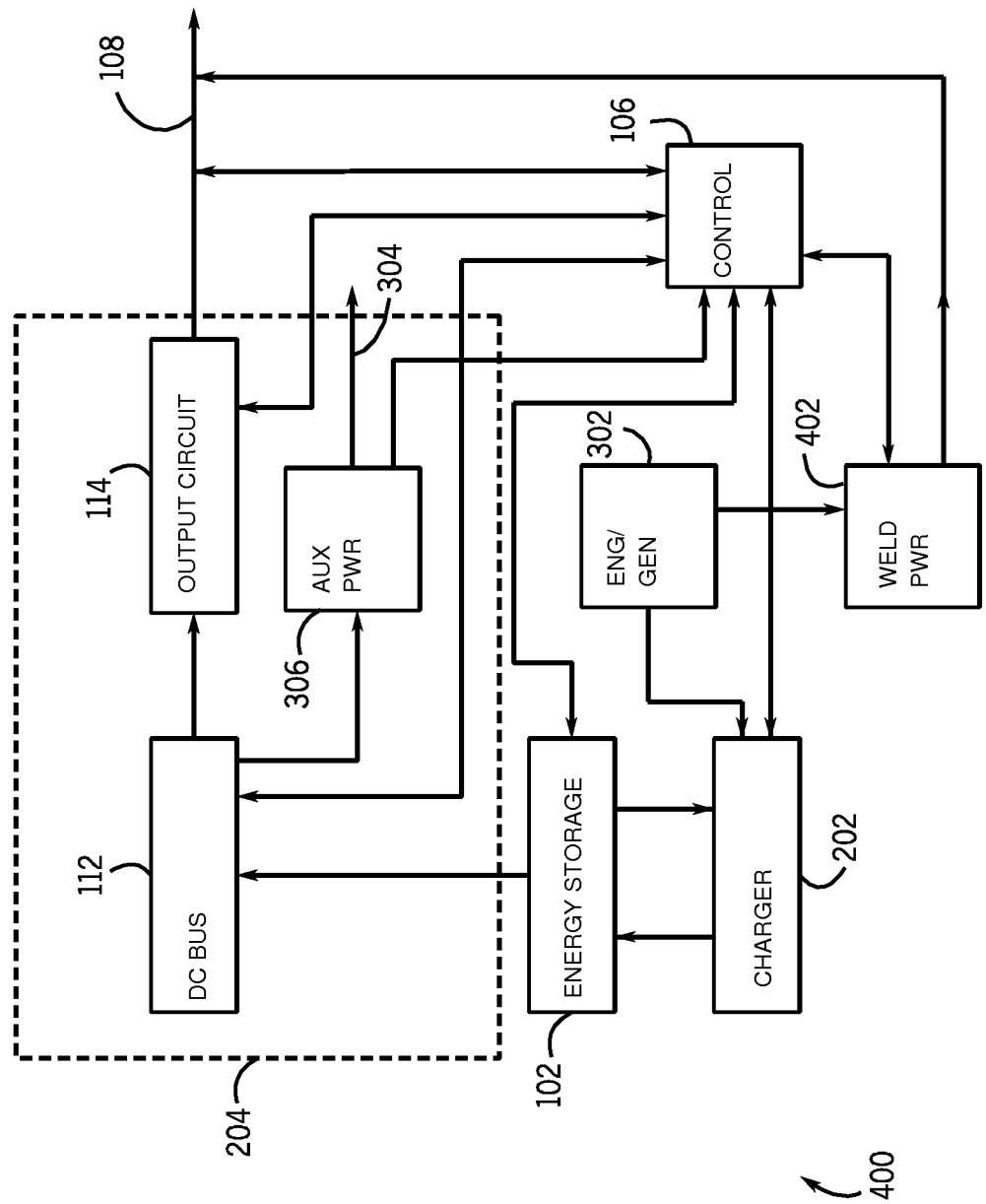
FIG. 5 is block diagram of a welding type power supply in accordance with one embodiment of the invention.

Referring now to FIG. 5, another embodiment similar to FIG. 4 is shown, but includes ac auxiliary circuit 306. Again, various components have been described above with respect to previous embodiments, and will not be described here. Weld power circuit 402 may be any known welding power circuit that operates off a generator, including choppers, inverters, converters, etc. Additional embodiments include the variations described above or below with respect to other embodiments, combining the generator power an the battery power to provide ac auxiliary power, as well as omitting generator 302 and using utility power as input power.

Figure 6:
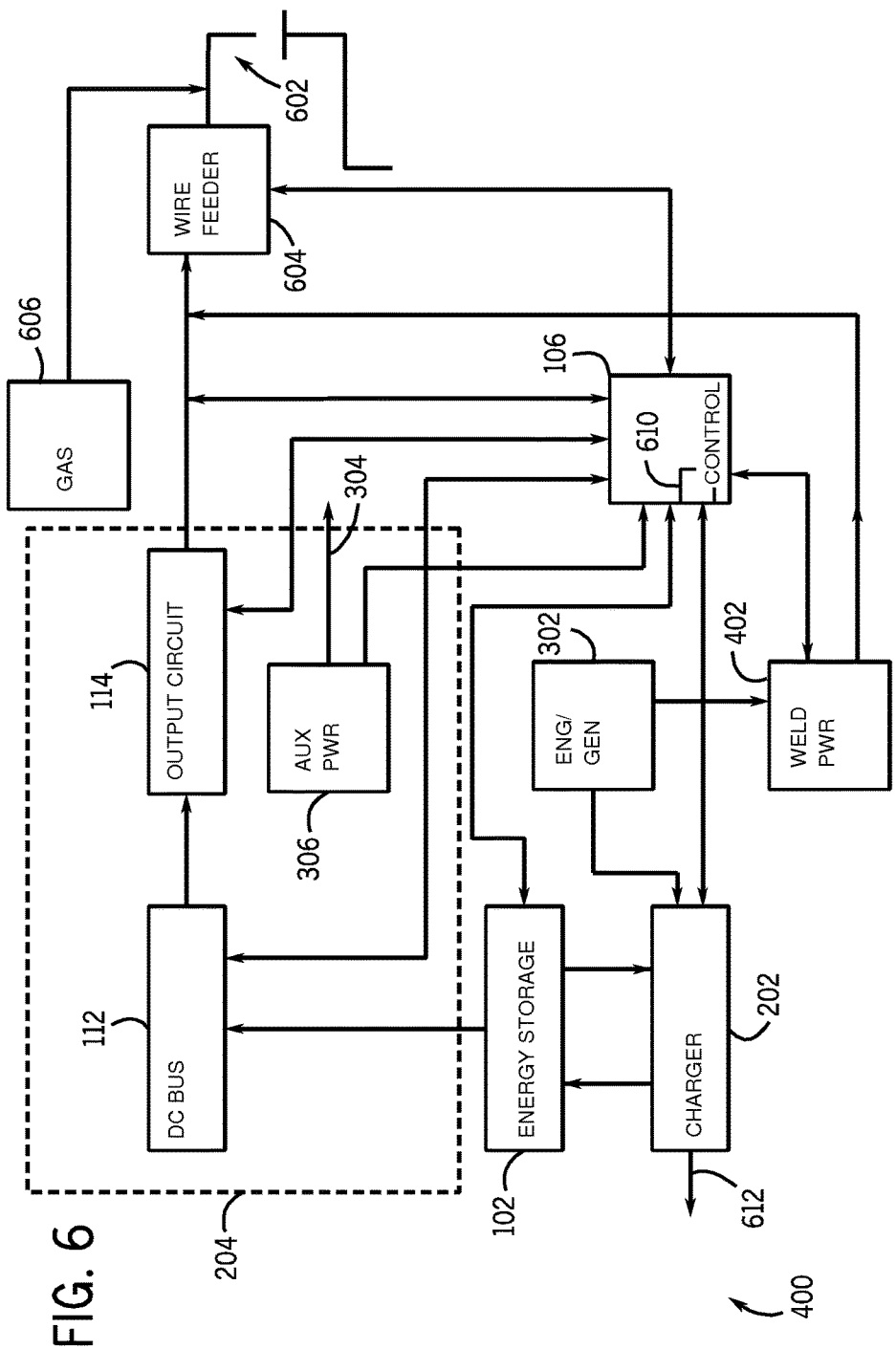
FIG. 6 is block diagram of a welding type power supply in accordance with one embodiment of the invention.

Referring now to FIG. 6, another embodiment similar to FIG. 5 is shown, but includes a welding gun 602, a wire feeder 604 and a source of gas 606. Again, various components have been described above with respect to previous embodiments, and will not be described here. Additional embodiments include the variations described above or below with respect to other embodiments, as well as omitting generator 302 and using utility power as input power.

A data port 612 is provided to download and/or upload charging data, schedules, etc. Port 612 may be located physically away from charger 202, for example connected to charge control module 610 on controller 106. Port 612 may be connectable to a standard serial connection (RS-232), or a PDA, such as through a hard wired or wireless connection. Data port, as used herein, includes a port to provide data to another device or display, and can be wired, wireless, RF, IR, etc. PDA, as used herein, is a personal digital assistant, and is a handheld device that can store data and/or programs. Well known, commercially available PDAs include Palm® and BlackBerry®. Charge control module 610 may include a data storage module, that stores information such as battery expected life, charging history, etc. Data storage control module, as used herein, includes a control module that stores data. Expected life of the battery, as used herein, is the life of a particular battery type based on one or more parameters such as number of charging cycles, amp-hours, open circuit voltage, load voltage, etc.

Voltage, current and thermal feedback is provided from battery 102 to charger 202. Thermal feedback or input, as used herein, includes data related to the temperature of the battery.

As has been shown in the various embodiments of FIGS. 1-6, and the described alternatives thereto, a welding system generally in accordance with the invention, includes one, a number, or all of the components described above. For example, one embodiment might include battery 102, converter 104, controller 106, aux ac output 304, without the remaining components. Other embodiments provide for different combinations of the components.

In operation charger 202 charges battery 102. Preferably controller 106 includes a charging control module 610 to control charger 202 (charging module 610 may be part of or physically and electrically separated and distinct from controller 106). Battery charging control module, as used herein, includes a control module that controls a power circuit to provide power for charging a battery. Although module 610 is only shown in FIG. 6, it can be included in other embodiments.

Battery charger 202 may have any topology, preferably including a boost preregulator such as that in U.S. Pat. No. 6,239,407. Preferably charger 202 includes a charging schedule control module that allows the charging to be performed in accordance with a charging cycle. Charging schedule, as used herein, includes a charging program for a battery that can include current, voltage, power, time, temperature, history, etc. Charging schedule control module, as used herein, includes a control module that controls a charger to provide a desired charging schedule.

The charging schedule can be specific to the type of battery and can include using feedback and/or charge data such as the total or average amp-hours of charging for the battery (which can be used for the current charging cycle to improve charging, or over several cycles to identify a battery that has failed or is close to failing), the number of discharge/recharge cycles, the total or average AH discharge of the battery, the total or average weld time, the total or average recharge time the number of faults (i.e. over temperature, low battery shutdown), recent cycle information (recharge time, recharge AH, final battery voltage), battery temperature data (peak temperature, average temperature), average battery voltage at the end of the discharge cycle. Additionally, power or energy (watt-seconds, joules, etc) provided to or from the battery, to or from the charger, or to or from the welder may be used for controlling battery usage, etc. Charge data, as used herein, includes data relating to past charges of a battery.

The present invention contemplates a fast recharge to return the battery to a sufficient state of recharge so that further welding can be done. Charger 202 also controls the amount of charge that is put into the battery to recharge the battery because battery life can be diminished by under charging or over charging of the battery. The system monitors the state of charge of the battery and suspends or allows operation of the welder based upon the state of charge. The state of charge could also be used to signal a charging circuit when to begin recharging the battery. The source of power can be automatically selected based on the availability of battery power and/or generator/utility power, and can be done in such a way as to avoid damaging the battery, or undesirably cycling the generator on and off.

Preferably, the weld is terminated (or the weld current drawn from a source other than battery 102) before the battery state of charge becomes too low. Various alternatives provide for shutting down the power draw from the battery when the battery voltage falls below a fixed threshold (such as 18 V for a 24 V battery), below a variable threshold (compensating for load current), monitoring open circuit battery voltage, when AH drawn from the battery exceeds a threshold, and/or using a time delay or time constant to reduce nuisance shutdown conditions. A recharge signal may be provided at a different threshold so recharging begins when some charge has been removed from the battery.

Charger 202 and battery 102 are preferably sized to weld over an extended period of time at a desired operating duty cycle. For example a properly sized charger and battery can provide for two minutes of welding out of a ten minute cycle and then recharge the battery during the remaining eight minutes of the ten minute cycle. The duty cycle allows greater welding power during the welding operation than would be available at any given time. For example the charger could draw less than 15 amps from a 115 VAC line while the welder provides upwards of 150-200 Amps of welding output. A prior art welding machine might draw 40-75 Amps peak from a 115 VAC line for that welding output, making the higher outputs impractical on a 115 VAC line.

Repeated discharge and recharge cycling over a period of time may cause battery 102 to overheat due to internal losses. Thus, it is desirable to limit the battery temperature rise or maximum battery temperature so as to prevent damage to the battery from excessive temperature. The preferred embodiment provides for monitoring the temperature of the battery and/or power circuit components, such as with a thermistor mounted to the case of the battery and disabling the welder if the battery temperature or temperature rise exceeds a threshold. Another embodiment provides for tracking of the number of discharge cycles and/or total AH drawn from the battery over a given time period and disable the welder when a given threshold is reached and not allow the welder to operate until some amount of idle cooling time has occurred.

The charging schedule preferably includes a number of phases, such as those shown in FIG. 7. They include, for example, phases A though E in the preferred embodiment. FIG. 7 shows the charging voltage (7A) and current (7B) for a preferred charging schedule. Phase of a charging schedule, as used herein, includes a portion of a charging schedule where the power, current or voltage has a predetermined slope or slopes.

Normally the recharge of the battery is a relatively slow process on the order of seconds or minutes even for a fast recharge. The preferred embodiment of invention provides for using a schedule that provides a desired recharge time and uses less than a maximum current draw.

After a typical discharge cycle (battery supplying current to the welder) the voltage of the battery will be at V1 (typically in the range of 1.5 to 2.0 Volts per cell or for two 12 V batteries in series between 18.0 & 24.0 VDC. Phase A is an initial recharge phase, and the battery voltage is initially at V1 and climbs to V4. During Phase A the charger 202 is controlled by charging control module 610 of controller 106 to provide its maximum charging current (in the preferred embodiment) such as 26-40 amps, and shown as I1, in graph 7B. However, for some batteries having a maximum acceptable charging current, module 610 will limit the current to a value the battery can accept.

Other embodiments provide for varying the maximum recharge current inversely with the battery voltage to provide a substantially constant power such that the power drawn from the AC line (the input to charger 202) is kept to some maximum level, while at the same time minimizing the recharge time of the battery. Another embodiment provides for a constant temperature recharge, by monitoring the charger and adjusting the power if components overheat.

Generally, the recharge time is a function of how fast the AH (amp hours) charge can be put back into the battery. For example, if the total output power of charger 202 is 750 Watts so that the line draw is kept below 15 amps, then the maximum current at 18 Volts on the battery could be 750 W/18.0 V=41.7 Amps. As the battery voltage increases the maximum current decreases to keep the output power at or below 750 Watts. For example, at a battery voltage of 30.0 VDC the maximum current would be 750 W/30.0 V=25 Amps.

After the battery voltage reaches V4, Phase B begins. V4 is typically 2.45 to 2.50 VPC (volts per cell) at 25° C., and can vary with a negative temperature coefficient of 3 to 5 mV per cell per degree C. Thus, either voltage feedback, or a combination of voltage and temperature feedback can be used to determine when to enter Phase B.

During phase B charger 202 provides a substantially constant voltage output maintaining V4 voltage across the battery. The voltage may be adjusted to compensate for temperature. As battery 102 charges, it will draw less current at voltage V4, thus charger 202 will have a decreasing output current during Phase B. The end of Phase B can be set either when the charging current decreases to I2, or after a preset or determined time (from T0 or T1), or a combination of current and time. Substantially constant, as used herein, refers to constant or nearly constant, such that the variations are not materially different from constant.

During Phase C the voltage is increased to V5, which is greater than V4. V5 is preferably about 2.60 VPC. The voltage may be adjusted to compensate for temperature. The current during Phase C is limited to a relatively low level I2, which depends on particular battery size and type but is on the order of 0.5 Amps for a typical battery. Phase C provides additional charge back into the battery in a relatively short time span by raising the voltage level, and ends after the current reaches a lower limit and/or after a given time interval. The time interval could be a fixed value or be a function of the time spent in Phase A and/or Phase B. Preferably, the time spent in phase C is approximately ½ of the total time spent in Phases A & B combined. Phase C may not be needed if enough time is spent in Phase B to achieve a "full" recharge—preferably 8 to 16 hours in Phase B.

Following Phase C the process begins Phase D which is a rest period. The battery is not being charged but is allowed to reach an equilibrium temperature and voltage (V2). After Phase D the battery is essentially fully recharged. The length of the rest period is, in various embodiments, from zero to days or weeks. During the rest period the battery will experience some self discharge. After the rest period expires then the charger will go to Phase E.

During Phase E the charger maintains the charge in the battery typically by maintaining a "float" voltage level V3 on the battery. This voltage is preferably around 2.27 VPC at 25° C., and is also preferably temperature compensated. The charge current is varied as up to the maximum output of the charger. Phase E can continue indefinitely or recycle back to the phase D rest period, either after a fixed timer interval or after the recharge current falls below a threshold level.

The transition from one phase to the next may be based upon some other combinations of voltage, current and time. Additionally, less than all of the phases are implemented in various embodiments.

Various alternatives provide for the battery charging control module to include data relating to the maximum desired amp-hour charge for the battery, the maximum charging current, or a plurality of charging schedules, such as for different battery types. Battery 102 has an ID code, such as a bar code, RFID chip, or other ID that is readable by controller 106, in one embodiment. In response to identifying the battery type, the controller 106 causes charger 202 to provide a selected charge schedule for the battery type. Another alternative provides for controller 106 to provide charge schedules customized via a user interface, such as a computer interface, pda, etc.

Controller 106 can provide the system with features such as shutting down the battery when there is a low battery voltage (relative to the nominal battery voltage). The shutdown threshold may be adjusted for the current level being drawn from the battery or the shutdown may be based on total or average AH drawn from the battery. The duty cycle or thermal cycling can be limited by limiting the output of system 600 (or limiting the recharging of battery 102) after a number of discharge/recharge cycles over a time interval to keep battery 102 from overheating, or the discharge and/or output can be limited based upon temperature of the battery.

Battery welder and/or the charge history of battery usage may be stored in controller 106 and provided on data port 612. Information such as service and warranty information may also be stored and provided via port 612. The information may include the number of discharge/recharge cycles, the total or average AH usage (charge or discharge) of the battery, the total or average weld time, the total or average recharge time the number of faults (i.e. over temperature, low battery shutdown), recent cycle information (recharge time, recharge AH, final battery voltage), battery temperature data (peak temperature, average temperature), average battery voltage at the end of the discharge cycle, and an indicator that the battery should be replaced soon.

The data may be reported on port 612 to an external device such as a pda, computer interface, LED display, etc. The data storage is preferably reset when the battery is replaced. The control circuit could also provide visual indicators such as LEDs to indicate the status of the recharge of the battery. It would be useful to know what phase the recharge is in, and when the charge is complete. The control circuit could also provide interface signals to the battery powered welder. The interface signals could enable or disable the operation of the battery power welder based on the status of the battery.

Figure 8:
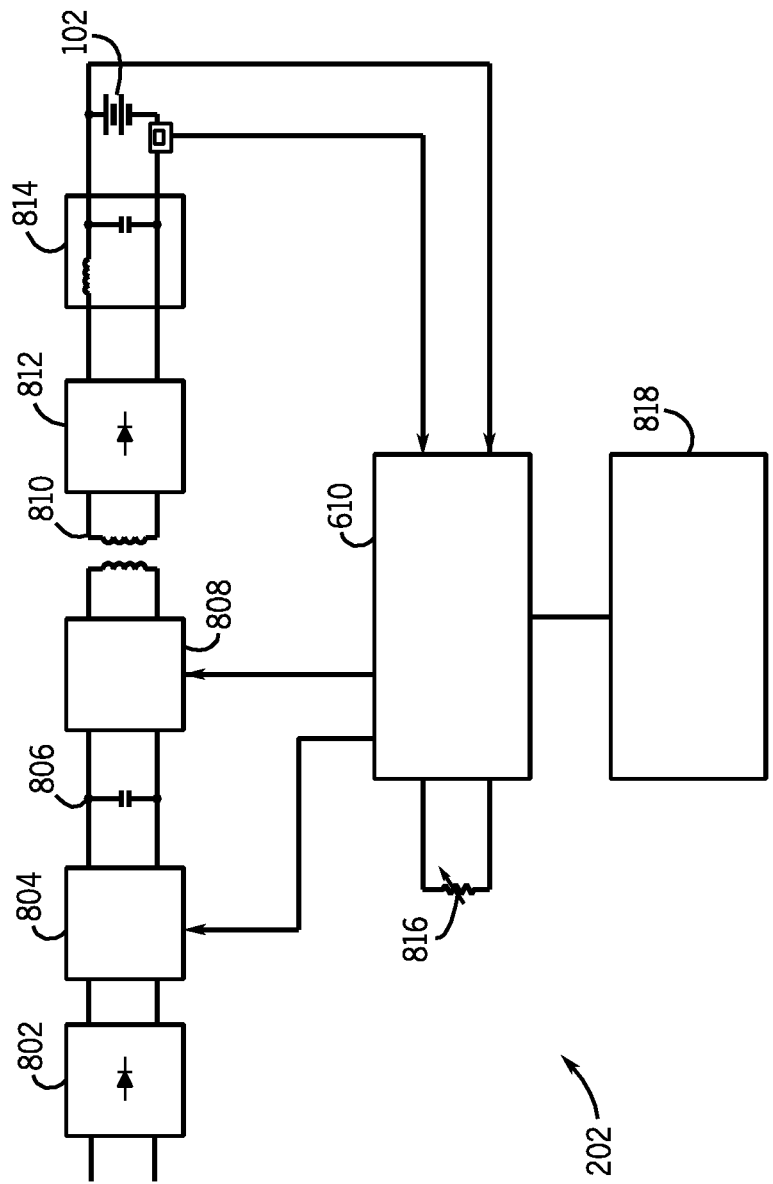
FIG. 8 is a block diagram of a battery charger in accordance with one embodiment of the invention.

Referring now to FIG. 8, a block diagram of one embodiment of battery charger 202 receives an input such as a 115/230 VAC, which is rectified by a rectifier 802. A boost pre-regulator 804 receives the rectified signal and creates a dc bus across capacitor 806. Preferably power factor correction is provided. The preferred embodiment provides for a dc bus voltage of about 300-400 VDC. The bus is provided to a high-frequency converter circuit 808. The output of the high frequency converter is coupled through a transformer 810 to an output rectifier 812 and an output filter 814 to provide a relatively smooth DC output to battery 102.

Charge control module 610 can be microprocessor based, and receives voltage and current feedback signals, along with temperature information from a thermistor 816. Module 610 provides control signals to converters 804 and 808. Converter 808 is preferably a pulse-width modulated inverter. Charge information can be displayed to the user on a display 818.

Display 818 can simply show the status, charge schedule, or allow modification of or selection of the charge schedule by the user. The computer interface could also provide useful information for service and troubleshooting, such as that described above. Alternatives provide for other circuits, such as those described above, or other alternatives, and omitting stages such as converter 804 and/or display 818.

Thermistor 816 is preferably used to provide thermal data to help manage the battery and/or the power circuits. Various alternatives provide for thermal management by monitoring the battery ambient temperature, the battery case temperature or the battery internal temperature, and terminating or reducing the welding load and/or the recharge current if the battery temperature exceeds a threshold. The temperature sensor could also restrict operation of the welder if the battery temperature is below a threshold. A fan can be turned on and/or off in response to temperature sensing.

Other alternatives provide for monitoring the length of time the input or output current (or voltage, power, etc) is at or above a threshold. This could be a continuous integral of amperage (or voltage or power) over time, or it could be a discrete measurement of time at a particular level, and control a fan or the output in response thereto.

Another preferred embodiment provides for the welding-type power supply describe above to be used with, or part of, a vehicle (anything capable of transport). The vehicle may be used primarily for transportation, or for other uses, such as a lift system.

When provided with a vehicle for transportation, such as a truck or humvee, the vehicle may be provided with a cavity to store the welding-type power supply. The cavity preferably includes venting or cooling to avoid overheating, and the welding-type power supply is preferably removable from the vehicle.

Figure 11:
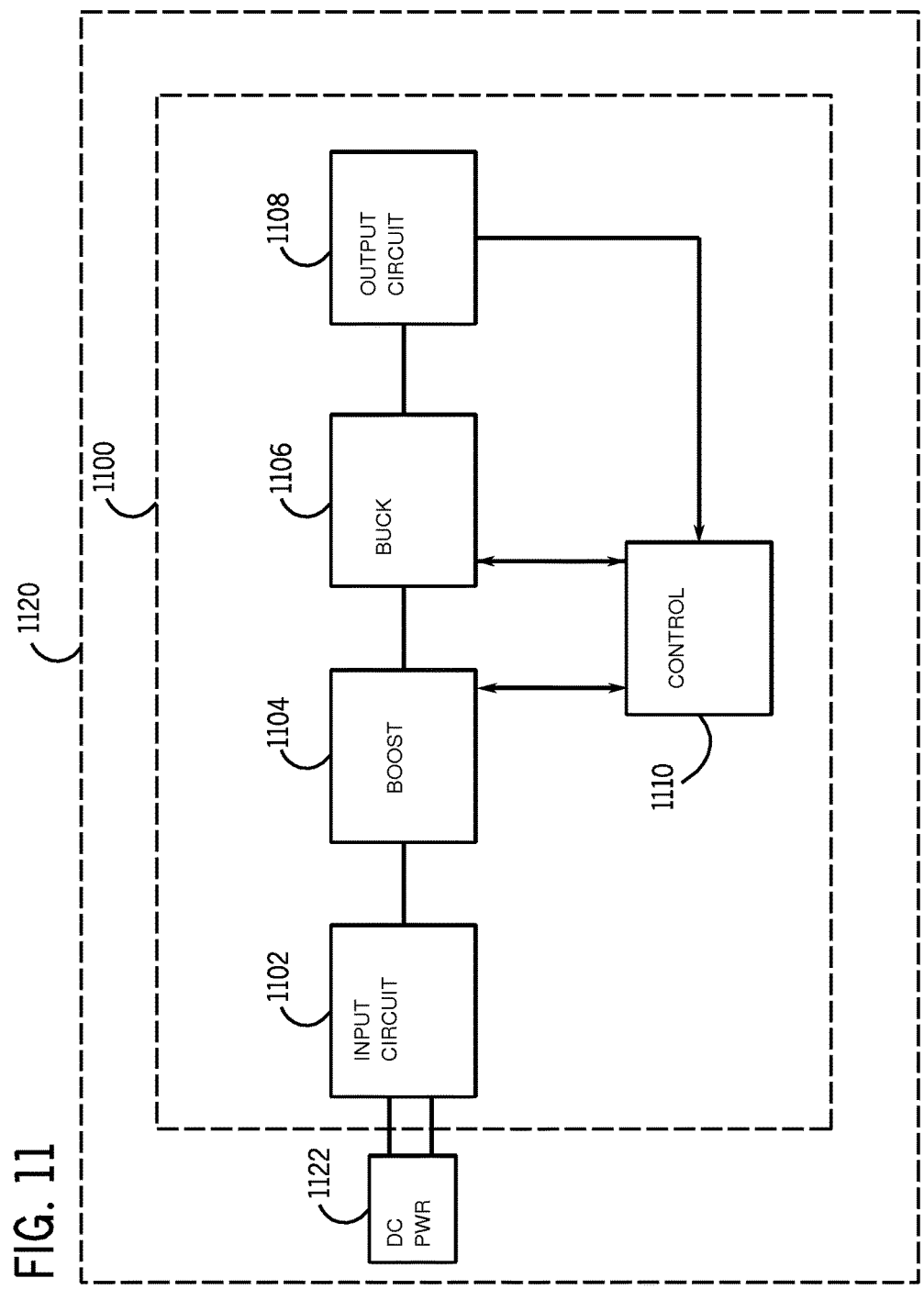
FIG. 11 is a block diagram of a vehicle and welding-type power supply in accordance with one embodiment of the invention.

When used with a lift system a welding-type power supply 1100 preferably includes, as shown in FIG. 11, an input circuit 1102, a boost circuit 1104 such as that in U.S. Pat. No. 6,239,407, a buck circuit 1106 such as that in FIG. 9, an output circuit 1108 and a controller 1110. The input and output circuits can include filters, capacitors, etc. common to welding-type power supplies or can merely be direct connections, and the convertors can be those described above. Preferably, the boost circuit provides a bus having a voltage of 70 volts, which is bucked by the buck converter to welding voltage. The controller preferably includes a CC control module with a user input to select a desired welding current, so that CC welding power is provided.

Welding-type power supply 1100 is shown as part of a vehicle 1120. Vehicle 1120 includes a dc power system 1122 having at least one battery (or in some applications an array of batteries) and a charging system. DC power system 1120 provides input power to input circuit 1102.

Controller 1110 can include the functions described above with respect to controllers, and preferably includes a battery protection module. Battery protection module, as used herein, is a module that monitors a battery and stops further welding when the battery voltage or the power left in the battery in dc system 1122 decreases below a minimum level, or below a level needed for the vehicle operation (such as lifting, engine starting, lights, etc.).

Controller 1110 also preferably includes a battery voltage sensing module that is active at start up to determine the nominal voltage of the battery. The nominal voltage in a lift system is often either 24 or 48 volts. Other input voltages could also be accommodated. Thus, it is useful to know this when setting the threshold voltage that indicates no more power should be drawn from the battery. The module can include an a/d converter fed to a microprocessor, or other voltage sensing techniques. Controller 1110 also includes a user interface that allows the user to set welding parameters, such as a welding current and/or voltage.

Thus, controller 1110 suspends welding-type operations when the battery of the vehicle system is sufficiently depleted to ensures that mobility and operability of the vehicle is maintained during low battery conditions. Also, controller 1110 may communicate weld parameters as well as vehicle power conditions to an operator to allow the operator to efficiently monitor the instantaneous power capabilities of the vehicle and welding-type system powered thereby.

Welding-type power supply 1100 is preferably mounted on the lift with the user. A gas supply can be included (either located with welding-type power supply 1100 or separate from it). Because welding-type power supply 1100 does not include batteries, it is not excessively heavy. However, one embodiment provides for welding-type power supply 1100 to be on the base of the lift (along with the gas supply if it is provided). This reduces the lifting load for the lift. Preferably the user interface is provided on the lift so the user need not dismount to adjust parameters. The user interface can be hard wired to the rest of controller 1110 or connected wirelessly. If welding-type power supply 1100 is located on the base, a second pair of output electrodes can be provided—one for the lift and one for ground work.

Numerous modifications may be made to the present invention which still fall within the intended scope hereof. Thus, it should be apparent that there has been provided in accordance with the present invention a method and apparatus for welding with a battery that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type power supply, comprising:
a battery; a first converter, having an input in electrical communication with the battery, and having a control input, and having a welding-type power output; and a controller, having a control output in electrical communication with the control input, and having at least one of a controlled voltage control module, a controlled short circuit control module and an AC weld control module in electrical communication with the control output; and a second converter, having a second input in electrical communication with the battery, wherein the battery configured to provide power to the second converter; and having a second control input, and having an ac auxiliary output, and wherein the controller; has an ac auxiliary control module with a second control output in electrical communication with the second control input.

2. The welding-type power supply of claim 1 wherein the controller has both of the controlled voltage control module and the AC weld control module in electrical communication with the control output.

3. The welding-type power supply of claim 1 wherein the controller has a plasma control module in electrical communication with the control output.

4. The welding-type power supply of claim 1 wherein the first converter is a boost converter.

5. The welding-type power supply of claim 1 wherein the second converter is a buck converter.

6. The welding-type power supply of claim 1, wherein the battery is removable.

7. The welding-type power supply of claim 1, wherein the battery is a lead acid battery.

8. The welding-type power supply of claim 1, further comprising a welding gun, in electrical communication with the welding-type power and a source of gas, disposed to provide gas to the welding gun.

9. The welding-type power supply of claim 1, further comprising a generator, having a generator output in electrical communication with the battery.

10. The welding-type power supply of claim 2 wherein the controller has a CC control module in electrical communication with the control output.

11. The welding-type power supply of claim 7, wherein the battery is comprised of a plurality of batteries in at least one of series and parallel.

12. A welding-type power supply,
comprising: a battery; a converter, having an input in electrical communication with the battery, and having a control input, and having a welding-type power output and an ac auxiliary output; an ac auxiliary converter; having a second input in electrical communication with the battery, wherein the battery configured to provide power to the second converter, and having an ac auxiliary output, and a controller, having a control output in electrical communication with the control input, and an ac auxiliary control module in electrical communication with the control output.

13. The welding-type power supply of claim 12 wherein the controller has at least one of a controlled voltage weld control module, a controlled short circuit weld control module, and an AC weld control module in electrical communication with the control output.

* * * * *